June 16, 1964  B. W. FORSYTH ETAL  3,137,441
PUNCHING DEVICE

Filed Dec. 26, 1961  2 Sheets-Sheet 1

INVENTORS
BRUCE E. FORSYTH
FRED MORING

BY *G. R. Gugger*

AGENT

June 16, 1964  B. W. FORSYTH ETAL  3,137,441
PUNCHING DEVICE

Filed Dec. 26, 1961  2 Sheets-Sheet 2

United States Patent Office 3,137,441
Patented June 16, 1964

3,137,441
PUNCHING DEVICE
Bruce W. Forsyth, Vestal, and Fred Moring, Endwell,
N.Y., assignors to International Business Machines Corporation, New York, N.Y., a corporation of New York
Filed Dec. 26, 1961, Ser. No. 162,292
2 Claims. (Cl. 234—78)

This invention relates to card punching device and more particularly to a punching device for transferring information from merchandise tags, credit cards and the like, to record cards which are used to control accounting machines.

The present device has particular application, for example, to transactions which occur at department stores and which involve the use of merchandise tags having code holes identifying the product to be sold; at gasoline service stations which make use of credit cards bearing information which identifies the customer to whom the card was issued; and at stock locations whereby inventory tags are employed to identify various items in stock. In transactions of this sort, when a purchase is made by a holder of a credit card, or a piece of merchandise is sold, or items are withdrawn from stock, it becomes necessary for an attendant to transfer the information from the particular card or tag involved to an invoice or record form of some kind for accounting.

In the past, it was common practice to fill out these invoice forms by hand. This resulted in a time consuming procedure and frequently errors were made in transcribing the information. More recently, duplicating devices have appeared on the market which are capable of automatically transferring the information from an inserted credit card or tag to a suitable invoice document which is later processed in an accounting machine. However, it has been found that most of these devices are rather complex in structure, are expensive to build, and are not always reliable in operation, particularly when a special sensing or feeler mechanism is incorporated in the device.

To satisfy the needs of the industry and to overcome the above drawbacks, the present device embodies a form of transfer punch construction which is extremely simple, inexpensive, and reliable in operation. The unique simplicity and reliability of the present device is made possible by the use of a reverse coding technique or system wherein the code contained in the input media, such as the credit cards or tags, is the reverse of the code desired in the output media, such as a record card which is adapted to be processed through an accounting machine. For example, for every location where a code hole is desired in the output media, there will be an absence of a code hole in the corresponding locations in the input media.

An important feature of the present device is the provision of a punching mechanism having free-floating punches which are selectively actuated by the tag or credit card itself to effect a punching operation. The punches are normally retained in an inoperative position. Suitable spring loaded ram means is employed to move an inserted tag toward the top of the punches. The free-floating punches are allowed to move ahead of the tag until they engage the surface of the record card to be punched. The tag continues to move toward the punches and those punches which encounter the imperforate portions of the tag are pushed by the tag to effectively punch the record card. However, those punches which register with the code holes in the tag yield to the record card and are pushed through the code holes in the tag and thus are rendered ineffective to produce any punchings in the record card. This unique construction of the punching mechanism eliminates any need for interposer structure or for sensing or feeler mechanism. The punching is simple, direct and accurate.

In a second embodiment of the device, the entire punch unit is caused to rotate about an axis so that punching is accomplished in a row-by-row manner thereby reducing the required punching force.

Accordingly, the principal object of the present invention is to provide an extremely simple, inexpensive and accurate punching device for transferring information from a tag, credit card, or the like, to a record card adapted for use in a record controlled accounting machine.

A further object of the present invention is to provide a punching mechanism as in the preceding object and wherein the punches are selectively actuated by the tag itself to carry out a punching operation.

A still further object of the present invention is to provide a transfer punching device for transferring in reverse form coded information from an input document to an output document.

A still further object of the present invention is to provide a transfer punching device having an arrangement of free-floating punches which are capable of being directly actuated by an input document.

A still further object of the present invention is to provide a transfer punching device wherein information from a plurality of input documents may be quickly and accurately transferred to a single output document.

The foregoing and other objects, features and advantages of the invention will be apparent from the following more particular description of preferred embodiments of the invention, as illustrated in the accompanying drawings.

Figure 5:
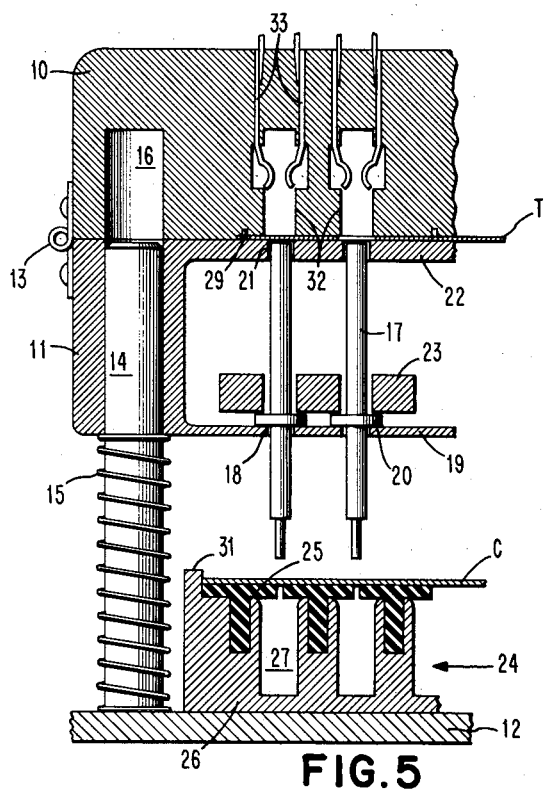
FIG. 5 is a sectional view of a portion of another form of machine made in accordance with this invention and showing details of the punching mechanism with the punches in their inoperative position.
Figure 6:
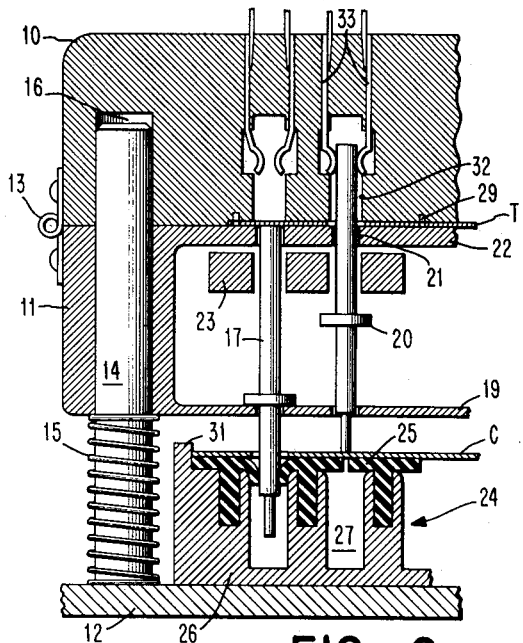
FIG. 6 is a sectional view as in FIG. 5 with the punches actuated to carry out a punching operation.

Referring in particular to FIGS. 5 and 6, there is shown a punching device which comprises an upper casing member 10, an intermediate support frame member 11 and a base plate 12. The upper casing and the support frame are hinged together by a hinge 13. The support frame 11 is slidably mounted on a guide rod 14 fastened to the base plate and is also yieldably supported by a coil spring 15 which extends between the support frame and the base plate. As will be described, the frame member and upper casing are moved along the guide rod to carry out a punching operation and hence a clearance recess 16 is provided in the upper casing.

The support frame 11 is adapted to carry a plurality of free-floating punch elements 17. The machine may be constructed to accommodate any number of punch elements and the punch elements may have a punching configuration which is circular or rectangular in nature, or of any other desired pattern. The punch elements are positioned in individual guide openings 18 located in the bottom plate portion 19 of the support frame and each punch element is provided with a lateral extension 20 which normally rests on the surface of the plate 19. The punch elements are also positioned at the top in guide openings 21 located in the top plate portion 22 of the support frame and when the punch elements are in their normal inoperative position, their upper ends are flush with the top surface of the plate portion 22. Also, in this position the lateral extensions 20 of the punch elements abut against the underside of stationary bars 23 which are fixed between the side frames of the machine and which function to limit the upward travel of the punch elements, the support frame and the upper casing member.

Mounted on the base plate 12 is a punch board or die 24 which has a plurality of resilient die strips 25 mounted in a suitable base 26. In the illustrated construction each of the strips 25 is T-shaped in cross-section, with the shank of the T being received in a suitable channel afforded in the base 26. The punch elements are in alignment with the space between adjacent T-strips and cavities 27 are provided in the base to collect the punched out chips, from which cavities the chips later may be dislodged in any conventional manner.

Figure 4:
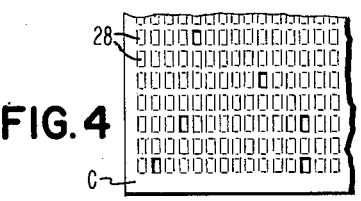
FIG. 4 is a fragmentary view of a tabulating card containing index-point areas which are individually scored so that they can be selectively removed by the punch, this being one preferred type of card upon which the present punching device is adapted to operate.

The punch board 24 is desgned to receive and support a tabulating record card C, FIG. 4, of the type in which at least some of the index-point areas on the card are individually scored to provide removable chips of card material 28 having frangible connections to the card. The frangible connections are at the corners of the individual index-point area occupied by the chip 28. The application of sufficient localized force to one of these chips 28 will cause the frangible connections thereof to break, thus detaching the chip from the card.

Figure 2:
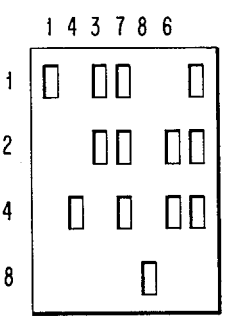
FIG. 2 illustrates a form of conventional coding which could be produced on an output document by the present machine.
Figure 3:
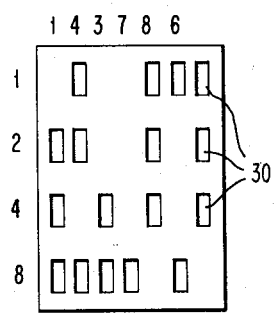
FIG. 3 illustrates the reverse code which would appear on the input document from which the present machine would produce on an output document the code shown in FIG. 2.

The top of the plate portion 22 of the support frame is designed to receive and support one or more input documents, such as a merchandise tag T, from which information is to be transferred to an output document, such as the tabulating card C. As was previously mentioned, in the operation of the present machine, the information code contained in the input document must be the reverse of the information code desired in the output document. Any coding may be used, however for purposes of illustration, there is shown in FIG. 2 a conventional 4 bit code representation for the number 143786. Since a conventional code representation is desired in the tabulating record card, the input credit card or tag bearing the information 143786 will be coded in reverse, as illustrated in FIG. 3. If a hole is desired in a location on the output document, there will be an absence of a hole in the corresponding location on the input media.

In the operation of the device shown in FIGS. 5 and 6, a tabulating record card C is positioned on the punch board 24 and the upper casing member 10 is opened to allow the positioning of one or more tags T on the plate portion 22 of the support frame and in position over the ends of the punch elements 17. It is possible to transfer information from several tags or credit plates into several fields on a single tabulating card, depending on how large or small the present device is made. In order to accurately locate the tags in the machine, a plurality of small locating pins 29 are provided on the top surface of plate 22. Suitable registration holes 30 (FIG. 3) are provided in the tags to register the tags on the locating pins 29.

To carry out the transfer punching operation, the upper casing member 10 is closed and the entire unit, comprising the upper casing 10, the support frame 11 and tag T, and the punch elements 17, is manually pushed downward, against the force of spring 15, toward the tabulating card C and punch board 24. Free-floating punch elements 17 ride downward with the support frame until they encounter the tabulating card C. The unit is moved downward until the bottom plate 19 strikes a raised stop ledge 31 on the punch board and during this latter travel those punch elements 17 which encounter no code holes in the tag T will be forced through the corresponding code positions of the tabulating card C by virtue of the solid portion of the tag acting directly as an interposer against the ends of the punch elements, as shown in FIG. 6. Thus, every imperforate code position on the tag directly forces its associated punch element 17 to punch a code hole in the corresponding position on the card C. Those punch elements 17 which encounter code holes in the tag will be driven up through these holes by the tabulating card C. A plurality of cavities 32, provided in the upper casing member 10, are in alignment with the ends of the punch elements to receive those that are driven upward by the card C.

A pair of wire contacts 33 are suitably mounted in each of the cavities 32 for applications in which it is desired to use the present device to relay information to some other accounting location. Those punch elements 17 which are driven back through the code holes in the tag or credit plate will connect the gap between their associated contacts 33, as shown in FIG. 6, and suitable circuits could be completed to relay account number information, for example, on a credit plate back to a central file for verification purposes and the like.

Upon the release of the manual pressure from the top of the unit, the spring 15 will force the unit back up to its normal position. The lower plate portion 19 of the support frame works against the lateral extensions 20 to restore the punch elements 17 and the upward travel of the entire unit is stopped when the lateral extensions 20 strike the stop bars 23.

Figure 1:
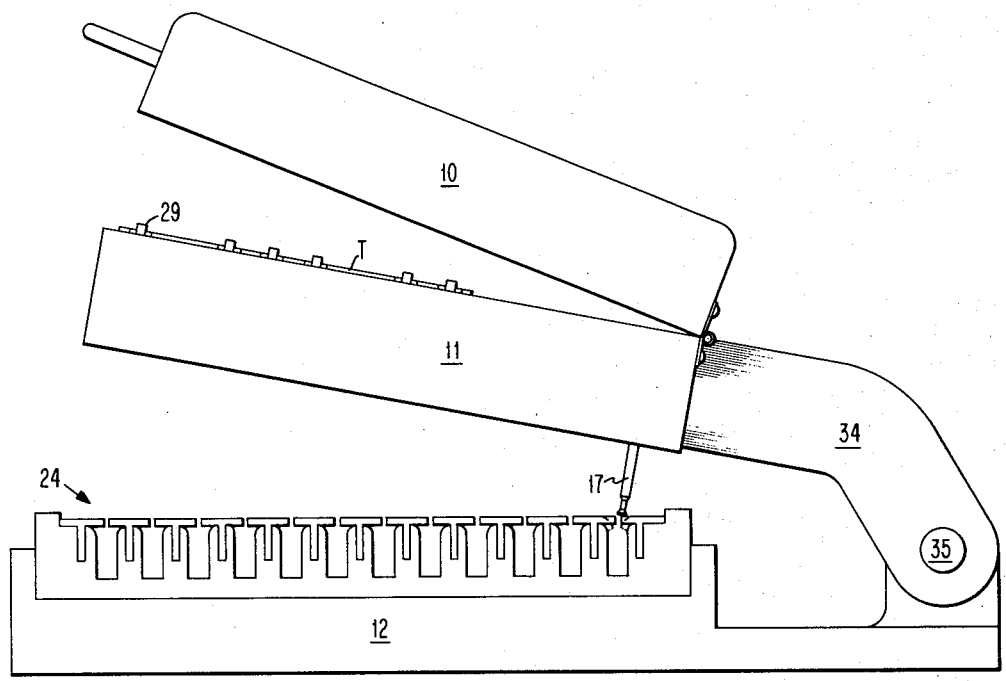
FIG. 1 is a side elevation view of one form of machine made in accordance with this invention, showing it with a side plate of the casing removed to expose the punch board.

In FIG. 1, there is shown a slightly modified version of the punching device just described in connection with FIGS. 5 and 6. In the device of FIG. 1, the upper casing 10, support frame and punch assembly 11 and the punch board 24 are constructed as shown in FIGS. 5 and 6 except that the unit is not slidably supported on a rod but instead is mounted on a pair of arms 34 which are pivotally connected by shaft 35 to the base plate 12. In this embodiment, the entire unit is caused to rotate about an axis so that punching is accomplished in a row-by-row manner thereby reducing the required punching force and further simplifying the design of the transfer punching device.

It can be appreciated that the present arrangement for employing the input document as an interposer to actuate the punch elements enables the present device to quickly and accurately transfer information. From the standpoint of economy and reliability, the present devices use a minimum number of parts and is of simple construction. It should also be pointed out that types of output documents other than the scored tabulating card shown in FIG. 4 may be used. The present device will transfer information to any output document which requires less force to perforate than does the input document.

While the invention has been particularly shown and described with reference to preferred embodiments thereof, it will be understood by those skilled in the art that various changes in form and details may be made therein without departing from the spirit and scope of the invention.

What is claimed is:

1. A transfer punching device for transferring coded information perforated in code positions on an input merchandise tag to an output document comprising, a punch board for supporting an output document in position to be punched, a movable support frame, a cover member attached to said support frame for movement therewith, means on said support frame for supporting a perforated input mechandise tag in fixed position between said frame and said cover member, a plurality of apertures in said input tag support means and in alignment with the code positions on said input tag, and a plurality of free-floating punch elements carried by said support frame and disposed between said input tag and output document, said punch elements having end portions which extend into said apertures whereby upon movement of said support frame toward said output document the punch elements will be carried into contact with said output document, after which those punch elements which encounter imperforate code positions on said input tag will be driven by the input tag to perforate said output document, and those punch elements which encounter perforations in code positions on said input tag will be forced through said perforations in the input tag by said output document, said output document requiring less force to perforate than said merchandise tag.

2. A transfer punching device for transferring coded information perforated in code positions on input merchandise tags to an output document comprising, a punch board for supporting an output document in position to be punched, a movable support frame, a cover member attached to said support frame for movement therewith, means on said support frame for supporting a plurality of perforated input merchandise tags in fixed positions between said frame and cover member, a plurality of apertures in said input tag support means and in alignment with the code positions on said positioned input tags, and a plurality of free-floating punch elements carried by said support frame and disposed between said input tags and output document, said punch elements having end portions which extend into said apertures whereby upon movement of said support frame toward said output document the punch elements will be carried into contact with said output document, after which those punch elements which encounter imperforate code positions on said input tags will be driven by the input tags to perforate said output document, and those punch elements which encounter perforations in code positions on said input tags will be forced through said perforations in the input tags by said output document, said output document requiring less force to perforate than said merchandise tags.

References Cited in the file of this patent

UNITED STATES PATENTS

| | | |
|---|---|---|
| 2,225,313 | McCart | Dec. 17, 1940 |
| 2,556,687 | Faulkner | June 12, 1951 |
| 2,918,123 | Balde | Dec. 22, 1959 |